United States Patent
Kaye et al.

(10) Patent No.: US 9,787,848 B2
(45) Date of Patent: Oct. 10, 2017

(54) MULTI-BEACON MEETING ATTENDEE PROXIMITY TRACKING

(71) Applicant: Plantronics, Inc., Santa Cruz, CA (US)

(72) Inventors: Michael Kaye, Santa Cruz, CA (US); Brent Thorington, Santa Cruz, CA (US)

(73) Assignee: Plantronics, Inc., Santa Cruz, CA (US)

( * ) Notice: Subject to any disclaimer, the term of this patent is extended or adjusted under 35 U.S.C. 154(b) by 29 days.

(21) Appl. No.: 14/517,496

(22) Filed: Oct. 17, 2014

(65) Prior Publication Data

US 2015/0111552 A1 Apr. 23, 2015

Related U.S. Application Data

(60) Provisional application No. 61/893,089, filed on Oct. 18, 2013.

(51) Int. Cl.

| | |
|---|---|
| *H04M 3/42* | (2006.01) |
| *H04M 3/56* | (2006.01) |
| *G06Q 10/10* | (2012.01) |
| *H04W 4/02* | (2009.01) |
| *H04W 4/12* | (2009.01) |
| *H04W 4/16* | (2009.01) |
| *G10L 15/00* | (2013.01) |
| *G10L 17/00* | (2013.01) |
| *H04W 4/00* | (2009.01) |
| *H04W 4/06* | (2009.01) |
| *H04N 7/15* | (2006.01) |
| *H04W 88/06* | (2009.01) |

(52) U.S. Cl.
CPC ........ *H04M 3/568* (2013.01); *G06Q 10/1093* (2013.01); *G06Q 10/1095* (2013.01); *G10L 15/00* (2013.01); *G10L 17/00* (2013.01); *H04M 3/56* (2013.01); *H04M 3/565* (2013.01); *H04M 3/566* (2013.01); *H04N 7/15* (2013.01); *H04W 4/008* (2013.01); *H04W 4/02* (2013.01); *H04W 4/023* (2013.01); *H04W 4/06* (2013.01); *H04W 4/12* (2013.01); *H04W 4/16* (2013.01); *H04M 2203/2094* (2013.01); *H04W 88/06* (2013.01)

(58) Field of Classification Search
CPC ................................................. H04M 2250/62
USPC ........................................................ 455/416
See application file for complete search history.

(56) References Cited

U.S. PATENT DOCUMENTS

| | | | |
|---|---|---|---|
| 6,275,575 B1 | 8/2001 | Wu | |
| 6,697,649 B1 * | 2/2004 | Bennett et al. | ............... 455/574 |
| 2006/0287813 A1 | 12/2006 | Quigley | |

(Continued)

*Primary Examiner* — Santiago Garcia

(57) ABSTRACT

Methods and apparatus for accurately determining whether a mobile electronic device associated with a user is at a meeting location comprise: initiating a scan for a first beacon signal emanating from a first beacon located at the meeting location; detecting the first beacon signal; confirming that the mobile electronic device is within a predetermined proximity of the first beacon based on the first beacon signal; and responsive to confirming that the mobile electronic device is within a predetermined proximity of the first beacon activating a trigger system enabling further resolution of the proximity of the mobile electronic device to the meeting location, wherein the trigger system is located at an entry to the meeting location, and activating a confirmation system to confirm that the mobile electronic device is at the meeting location.

12 Claims, 10 Drawing Sheets

(56) References Cited

U.S. PATENT DOCUMENTS

| | | |
|---|---|---|
| 2007/0233785 A1* | 10/2007 | Abraham et al. ............. 709/204 |
| 2007/0255786 A1* | 11/2007 | Mock et al. .................. 709/204 |
| 2008/0176583 A1* | 7/2008 | Brachet et al. ............ 455/456.3 |
| 2008/0195426 A1* | 8/2008 | Moore .............................. 705/5 |
| 2009/0220066 A1 | 9/2009 | Shaffer et al. |
| 2010/0098230 A1 | 4/2010 | Bhow |
| 2011/0122220 A1* | 5/2011 | Roberts et al. ............ 348/14.04 |
| 2011/0141276 A1 | 6/2011 | Borghei |
| 2012/0040646 A1 | 2/2012 | Garg et al. |
| 2012/0230484 A1 | 9/2012 | Kannappan et al. |
| 2012/0284757 A1* | 11/2012 | Rajapakse ....................... 725/81 |
| 2013/0101106 A1 | 4/2013 | Mairs et al. |
| 2014/0058778 A1 | 2/2014 | McLarty et al. |
| 2014/0108084 A1* | 4/2014 | Bargetzi et al. ............. 705/7.19 |
| 2015/0046370 A1 | 2/2015 | Libin et al. |
| 2015/0088572 A1 | 3/2015 | Mai et al. |
| 2015/0110259 A1 | 4/2015 | Kaye et al. |
| 2015/0112748 A1 | 4/2015 | Kaye et al. |

\* cited by examiner

MULTI-BEACON MEETING ATTENDEE PROXIMITY TRACKING

CROSS-REFERENCE TO RELATED APPLICATIONS

This application claims benefit of U.S. Provisional Patent Application Ser. No. 61/893,089 entitled "UNIFIED CONFERENCING," filed Oct. 18, 2013, the disclosure thereof incorporated by reference herein in its entirety.

FIELD

The present invention relates to the conduct of teleconference meetings.

BACKGROUND

Teleconferencing technologies have existed for some years. Such technologies include on-demand collaboration, online meeting, web conferencing and videoconferencing applications that are geared toward enabling face to face and/or real time communication between remotely located participants.

Many teleconferencing products are known in the industry. Examples of such products comprise systems like Cisco's WebEx or Microsoft's Lync technologies. Such products enable the transmission of information between remote users using voice, video, desktop sharing, and a wide range of other multi-media technologies.

In current technologies the set-up of such meetings is somewhat laborious and primitive. In one example, a meeting can be scheduled for a specific location having a scheduled start time and a list of proposed meeting attendee's. As the meeting time approaches, each remote attendee is contacted and connected to the meeting one at a time. Contemporaneously each of the local attendees arrive at the meeting until the meeting is ready to start. At that point a roll call is conducted to determine who is in the meeting and who may not be in the meeting. If the meeting attendees are satisfied that the correct attendees (and enough attendees) are present the meeting can commence. In some cases additional participants will join the meeting necessitating an updated roll call and otherwise disrupting the meeting. Although the existing technologies accommodate the purposes of such remote teleconferencing, improvements can be made.

SUMMARY

In general, in one aspect, an embodiment features a method for accurately determining whether a mobile electronic device is at a predetermined destination, the method comprising: scanning for a first beacon signal emanating from a first beacon located at the destination; detecting the first beacon signal; confirming proximity to the first beacon based on the first beacon signal; responsive to confirming proximity to the first beacon, scanning for a second trigger beacon signal emanating from a second trigger beacon located proximal to the destination; confirming proximity to the second beacon based on the second beacon signal; responsive to confirming proximity to the second beacon, scanning for a third confirmation beacon signal emanating from a third beacon located at the destination; confirming proximity to the third beacon based on the third beacon signal; responsive to confirming proximity to the third beacon, generating a message announcing that the mobile electronic device is at the destination.

Embodiments of the method can include one or more of the following features. In some embodiments, the destination comprises a meeting location for a teleconference meeting; the mobile electronic device is associated with a meeting attendee; and generating the message comprises generating a message announcing that the attendee is in the teleconference meeting. In some embodiments, the meeting location comprises a room where the teleconference meeting is to be conducted; the first beacon is located inside the room; the second trigger beacon is located at an entrance to the room; and the third beacon is located inside the room. In some embodiments, confirming proximity to the first beacon comprises: comparing the first beacon signal with a threshold condition, wherein responsive to the threshold condition is met, the proximity to the first beacon is confirmed. In some embodiments, scanning for the second trigger beacon signal comprises: increasing a scan rate of the scanning for a specified period of time; responsive to not confirming the proximity to the second beacon within the specified period of time, reducing the scan rate; and responsive to confirming the proximity to the second beacon within the specified period of time, initiating the scanning for the third confirmation beacon signal. In some embodiments, confirming proximity to the third confirmation beacon comprises: comparing the third confirmation beacon signal with a third threshold condition, wherein responsive to the third threshold condition being met, the proximity to the third confirmation beacon is confirmed; and transmitting the generated message to a meeting coordinator. In some embodiments, comparing the first beacon signal with the first threshold condition comprises measuring a signal strength for the first beacon signal, wherein the first threshold condition comprises a first relative signal strength indicator (RSSI) value, and wherein the first threshold condition is met when the signal strength for the first beacon signal exceeds the first RSSI value; and comparing the third confirmation beacon signal with the third threshold condition comprises measuring a signal strength for the third confirmation beacon signal, wherein the third threshold condition comprises a third RSSI value, and wherein the third threshold condition is met when the signal strength for the third confirmation beacon signal exceeds the third RSSI value. In some embodiments, the third beacon is the same as the first beacon and wherein the first RSSI value is less than the third RSSI value. In some embodiments, the first beacon signal comprises a Bluetooth signal and wherein the third beacon comprises one of an optical signal or a sound signal. In some embodiments, the first beacon signal comprises a Bluetooth signal and wherein the transmitted message is configured as one of a wireless message or a cellular telephone message. In some embodiments, the transmitted message is transmitted to a meeting coordinator system and can be used to track meeting participation status for meeting participants. In some embodiments, initiating the scan for the first beacon signal is in response to a prompt by a calendar event identifying that a teleconference meeting is to occur at the predetermined destination.

In general, in one aspect, an embodiment features a method for accurately determining whether a mobile electronic device associated with a user is at a meeting location, the method comprising: initiating a scan for a first beacon signal emanating from a first beacon located at the meeting location; detecting the first beacon signal; confirming that the mobile electronic device is within a predetermined proximity of the first beacon based on the first beacon signal;

and responsive to confirming that the mobile electronic device is within a predetermined proximity of the first beacon activating a trigger system enabling further resolution of the proximity of the mobile electronic device to the meeting location, wherein the trigger system is located at an entry to the meeting location, and activating a confirmation system to confirm that the mobile electronic device is at the meeting location.

Embodiments of the method can include one or more of the following features. In some embodiments, activating the trigger system comprises: activating an entry access system located at an entry to the meeting location. In some embodiments, the entry access system comprises an RFID entry access system. In some embodiments, the confirmation system comprises a second confirmation beacon located within the meeting location and which emanates a second confirmation beacon signal; and activating the confirmation system comprises scanning for the second confirmation beacon signal, detecting the second confirmation beacon signal, and confirming proximity to the second confirmation beacon based on the second confirmation beacon signal; and wherein the method further comprises generating a message announcing that the mobile electronic device is at the meeting location, and transmitting the message to a meeting coordination system capable of tracking the participation status of the user.

In general, in one aspect, an embodiment features a mobile electronic device configured to determine whether the device is at a teleconference meeting location, the predetermined mobile electronic device comprising: a receiver; a transmitter; a memory for storing data; a processor for executing computer readable instructions, the processor comprising a gross proximity module that enables, identification of a meeting time and the teleconference meeting location; identification of a first beacon located at the teleconference meeting location, wherein the first beacon is configured to transmit a first beacon signal; the receipt of an alert at a time prior to the meeting time; responsive to the alert, initiating a scan for the first beacon signal; confirmation that the mobile electronic device is at a first proximity to the teleconference meeting location; an intermediate proximity module that enables, activating a trigger system affirming that the mobile electronic device is at a second proximity to the teleconference meeting location wherein the second proximity is closer to the teleconference meeting location than the first proximity; a confirmation proximity module that enables, upon affirmation by the trigger system that the mobile electronic device is at the second proximity to the meeting location, scanning for a third confirmation beacon signal emanating from a third beacon located at the destination; confirmation that the mobile electronic device is at the meeting location; and a meeting participation status module that enables, upon confirming that the mobile electronic device is at the meeting location, generating a message announcing that the mobile electronic device is at the meeting location, and transmitting the message announcing that the mobile electronic device is at the meeting location to a meeting coordinator that updates meeting participation for the meeting. Some embodiments comprise the meeting location comprises an entry access system that enables the detecting of the mobile electronic device at an entrance to the meeting location; and the intermediate proximity module further enables activating the entry access system. In some embodiments, the entry access system comprises an RFID entry access system. In some embodiments, a second trigger beacon is located proximal to the meeting location: and the intermediate proximity module further enables scanning for a second trigger beacon signal emanating from the second trigger beacon, and confirming the second proximity to the second beacon responsive to a signal strength for the second trigger beacon signal exceeding a relative signal strength indicator (RSSI) value.

The details of one or more implementations are set forth in the accompanying drawings and the description below. Other features will be apparent from the description and drawings, and from the claims.

DESCRIPTION OF DRAWINGS

The following detailed description will be more readily understood in conjunction with the accompanying drawings, in which.

In the drawings, like reference numerals designate like structural elements. Also, the depictions in the drawings are not necessarily to scale.

DETAILED DESCRIPTION

The embodiments set forth herein below are to be taken as illustrative rather than limiting. It should be readily apparent to those of ordinary skill in the art that various changes and modifications in form and detail may be made without departing from the spirit and scope of this disclosure.

Techniques for the automated conduct of a teleconference are disclosed. As used herein, teleconferencing includes any communication of information between remotely located participants. In general, teleconferencing refers to the live exchange and mass articulation of information among several persons and machines remote from one another but linked by a telecommunications system. Terms such as audio conferencing, telephone conferencing and phone conferencing are also sometimes used to refer to teleconferencing.

Telecommunications systems can support multi-media teleconferencing by providing one or more of the following: audio, video, augmented reality, and/or data services by one or more means, such as telephone, computer, telegraph, teletypewriter, radio, and television.

Figure 1:
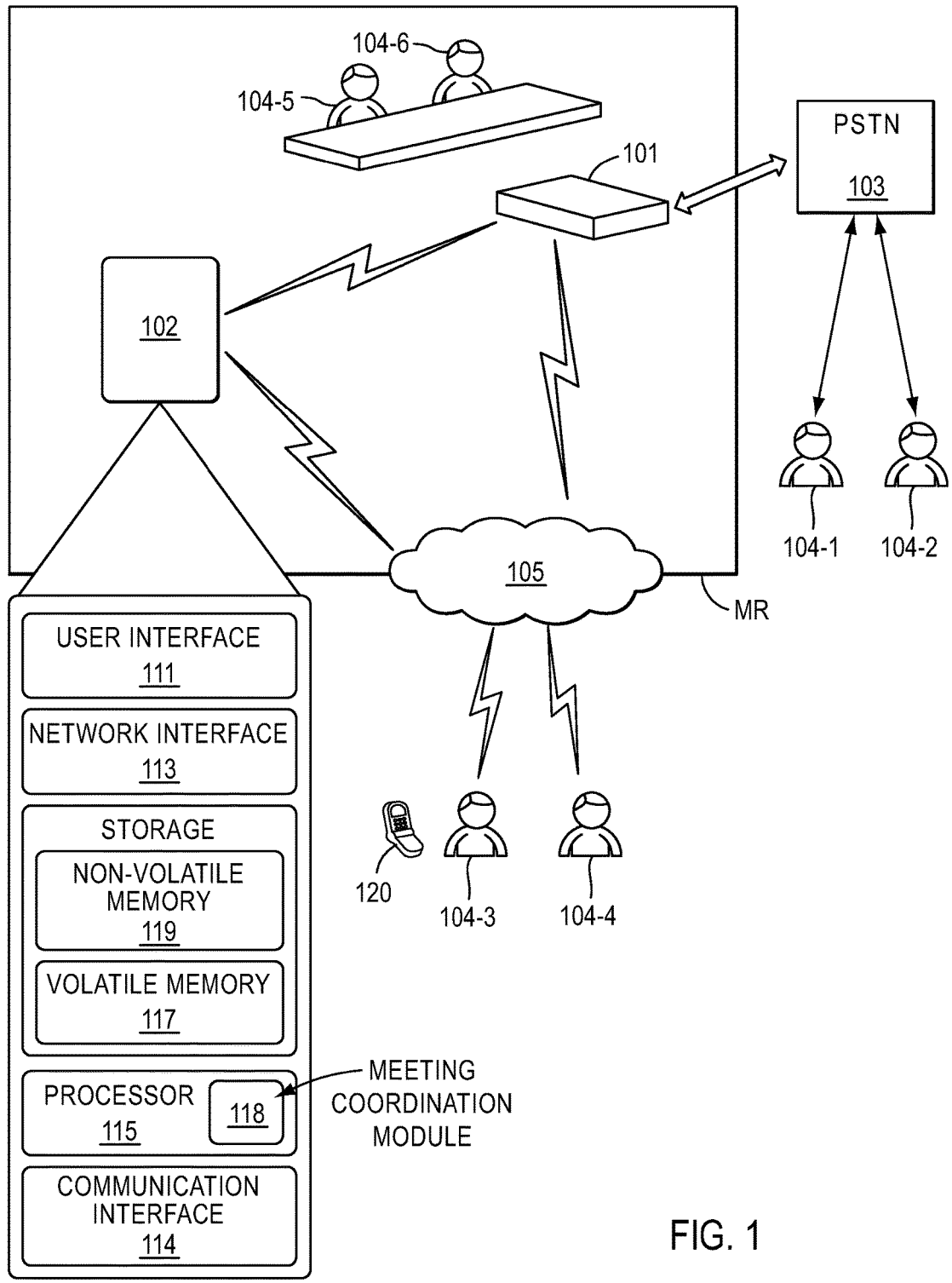
FIG. 1 comprises a system diagram illustrating one embodiment of a smart automated teleconferencing system.

FIG. 1 depicts a "smart" conferencing system according to one embodiment. FIG. 1 shows a teleconferencing system 101, also referred to as teleconferencing gateway or access point. A typical conferencing system 101 includes hardware sufficient to connect remote conference participants to a teleconference and enable communication among them. Such conferencing systems can facilitate connections to the Internet to enable VoIP communication, a private branch exchange (PBX) system, and/or connection with telephony systems (e.g., PSTN) as well as the full range of other information communication systems.

Such conferencing systems 101 can be as simple as a specially configured PC board installed on a computer, a computer with software installed to enable teleconferencing, or the like. More elaborate systems having more integrated components can also be used. Examples include systems having Internet proxies, cameras to facilitate video conferencing, audio sound systems, as well as other associated devices and systems. One example of a system capable of utilizing this embodiment is a Polycom HDX produced by Polycom, Inc. headquartered in San Jose, Calif.

Here the conferencing system 101 is located at a meeting location. In one example the meeting location can be a meeting room MR operating as a base station for a teleconference event. The conferencing system 101 is configured to operate through a number of communication hubs enabling connection of remote conference participants. As depicted here, the conferencing system 101 is connected with a public switched telephone network (PSTN) 103 which enables telephonic connection with one or more remotely located meeting participants (104-1, 104-2) allowing those participants to take part in a teleconference meeting.

In another alternative, the remotely located meeting participants (104-3, 104-4) can enter the meeting via a network connection 105 that can include the Internet. By way of example, a VoIP protocol or other data transmission approach can be used to transmit and receive information in the teleconference. As stated previously, the conference can be a multi-media interactive experience enabling the transmission and receipt of a full range of audio, video, image, interactive, and augmented reality information, as well other information and data.

Such connections will enable communication and interaction with local meeting participants that are attending the conference (104-5, 104-6) locally and are able to participate in the teleconference from an area proximal to the conferencing system 101. In one example, the local participants will be in the conference room that is hosting the meeting.

A meeting coordinator 102 enables automated operation of the teleconferencing system. The meeting coordinator 102 is in communication with the conferencing system 101 using wired and/or wireless communication. As shown in FIG. 1, the general components of a meeting coordinator 102 include a processor 115 which can execute instructions for operating a user interface 111, a network interface 113, a memory module (having volatile memory 117 and non-volatile memory 119) and communication interfaces 114 that enable communication of the coordinator 102 with external systems. The processor 115 can include a processing module that facilitates meeting coordination module 118, enabling various portions of the processes disclosed herein. The module 118 can comprise one or more of a hardware module, a software module, or a firmware module each operative to enable the coordinator to perform its meeting management operations. The various capabilities of the meeting coordinator 102 will be described herein. Methods described below may be converted to instructions operable by processor 115 as well as conferencing system 101 to enable the methods described herein to be executed and implemented.

Such coordinators can be embodied in multi-media devices. Generally, the coordinator 102 can comprise any of a number of content presentation and interaction devices, for example, tablet computers, touch screen tablets, smart phones, personal digital assistants, and other associated portable electronic devices. One example of such a device comprises an iPad produced by Apple, Inc., headquartered in Cupertino, Calif.

In one such implementation, calendaring information concerning a teleconference meeting is used to automatically initiate a teleconference meeting. The process can be implemented using a processor module suitable for facilitating such a meeting. The module can be a hardware module, a software module, or a combination thereof enabling processes that enable the teleconferencing system to conduct the meeting.

Figure 2:
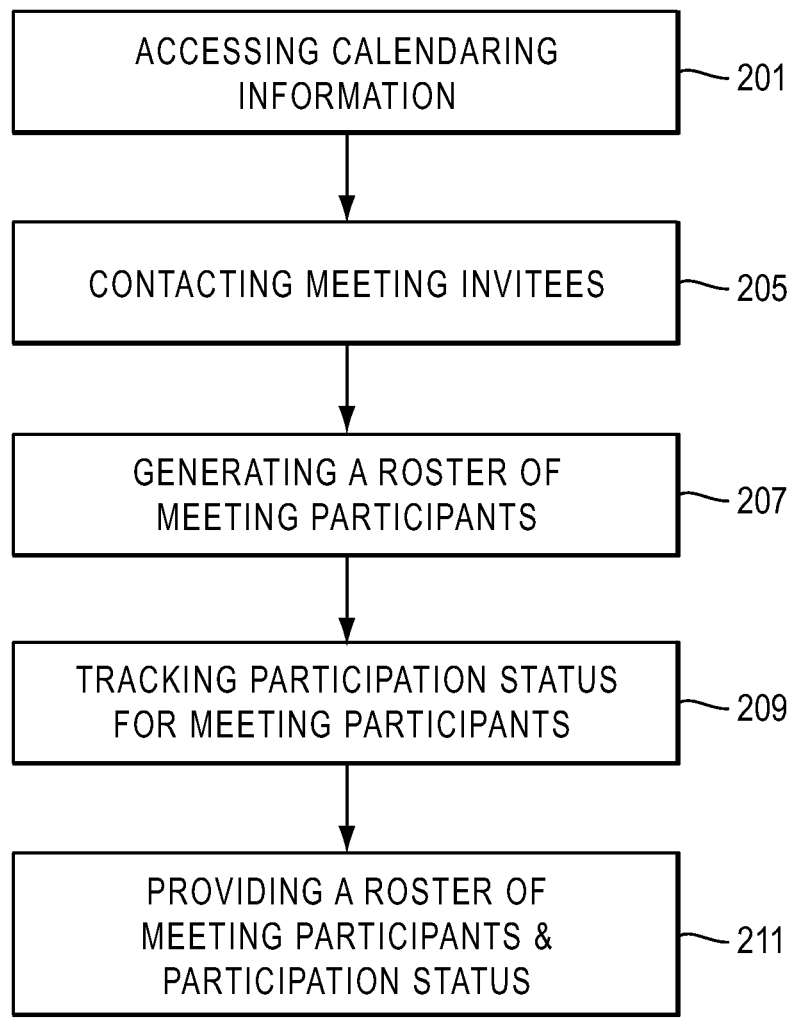
FIG. 2 is a flow diagram describing a method of automated tracking participation status of various meeting participants.

Referring now to FIG. 2, a flow diagram illustrating an embodiment for initiating a teleconference is now described. In particular, operations of the meeting coordinator 102 are discussed.

At 201, calendaring information is accessed for use by the meeting coordinator 102. This calendaring information generally includes a time for a teleconference and a meeting location for the physical location for the conference. Moreover, the calendaring information may comprise the identities of meeting invitees, the invitees being prospective attendees that are scheduled to participate in the meeting. Additionally, the calendaring information may include contact information for each of the meeting invitees. This contact information can comprise VoIP addresses, telephone numbers, e-mail addresses, and other information that enable an invitee to be joined to the teleconference. This information can be obtained from many sources and/or combination of sources. In some embodiments, the calendaring information can be obtained via a computer network 105 that can include the Internet, local area networks, and the like. For example, the information can be gleaned from stored calendar information stored on a corporate network. For example, a corporate database of meeting schedules and attendees can be used to obtain the calendaring information. In another embodiment, the calendaring information can be accessed from a local memory (e.g., non-volatile memory 109) resident on the meeting coordinator 102. In another approach, the calendaring information is provided by a meeting organizer that provides the information before the teleconference meeting. This particular implementation will be discussed in greater detail below.

At 205, the meeting coordinator 102 contacts the remote invitees and joins them to the meeting using the contact information in the calendaring information. For example, the conferencing system 101 connects to a remotely located invitee 104-1 using a telephonic connection. In another implementation a remotely located invitee 104-3 can be connected to the meeting using a VoIP communication.

In addition, at 207 a roster of meeting participants is generated. In one embodiment, all of the meeting invitees (e.g., 104-1, 104-2, 104-3, 104-4, 104-5, 104-6) are used to populate a roster of prospective attendees. For example, the names of all of the remotely located meeting invitees are added to the roster of meeting participants. In addition, the names of local invitees can also added to the roster. These local invitees (104-5, 104-6) comprise those who have been scheduled or otherwise invited to attend the meeting by physical presence at the meeting location. By way of completeness, the roster can be expanded to encompass uninvited guests that join the meeting as needed. Thus, a roster of meeting participants is created.

At 209 the participation status of each participant is tracked. The status can comprise a simple statement of attendance, for example an indication that an attendee is "in the meeting" for those present at the meeting location or remotely located participants that have been connected to the meeting. For attendees present at the meeting location, the status can be indicated as "in the room." Additionally, the status can be indicated as "not in the meeting" which may characterize remote invitees that are not yet connected to the meeting or have become disconnected from the meeting as departed attendees. In addition, the status of "not in the meeting" can characterize local invitees that are not yet in the meeting (typically at the meeting location) or have left the meeting (as departed attendees). In other embodiments, participation status can be further specified. For example, an invitee can have a participation status indicating an estimated time of arrival or simply a statement such as "on my way". An invitee can submit other indications of participation status such as "I'm Busy," "Cancel," "Call Me Back (PSTN)", and the like. Further details can be included as needed or desired depending on the embodiment.

A further aspect of this disclosure is the automated and automatic generation of the roster. In order to present a more clear illustration, this aspect will be discussed in further detail elsewhere in this disclosure.

Additionally, the participation status is updated throughout the meeting with the roster updated to show the entry and departure of meeting attendees. In particular, the tracking of whether participants enter and exit a meeting can be continually updated.

At 211, the roster information is provided for access to meeting participants. For example, this information can be viewed by the local meeting attendees using a display screen of the meeting coordinator. Alternatively, the roster information can be viewed by the local and remote meeting attendees using display screens of the teleconference system. Also, the information can be provided to mobile electronic devices, for example, devices associated with the meeting participants. In one example, such a device can comprise a smart phone associated with a meeting participant. The participant can view the roster using a display of the phone. Other embodiments enable the display of this information using any of a number of content presentation and interaction devices.

As briefly mentioned above, various embodiments also comprise methods and apparatus operable to increase the automated capacity of the system. In particular, the meeting attendees can be tracked in an automated manner vastly increasing the efficiency of the system.

In one implementation, meeting attendees can carry mobile electronic devices to enable the automatic tracking of meeting participation status. The mobile electronic devices may include smartphones, wearables, and the like. The wearables may include headsets, watches, glasses, and the like, or any other any device capable of receiving a beacon signal and determining a signal strength thereof. The mobile electronic devices may employ wireless communication technologies such as Bluetooth, Bluetooth Low Energy, Digital Enhanced Cordless Telecommunications (DECT), Wi-Fi, and the like. One embodiment of a system enabling such automated tracking of meeting participation and proximity location is described with respect to FIG. 3.

In such an embodiment, a meeting location 301 can have the following system arranged therein. Typically, such a meeting location is a room suitable for hosting a teleconference meeting. A teleconference conferencing system 101 as previously described can be arranged in the room to operate as a meeting hosting system facilitating the meeting by operating meeting peripheral devices (display screens, projectors, speakers, microphones, and the like) and also connecting remotely located meeting participants to the teleconference. A meeting coordinator 102 (which may be as configured above) is also located at the meeting location 301. As above the meeting coordinator 102 is in communication with the conferencing system 101.

Figure 3:
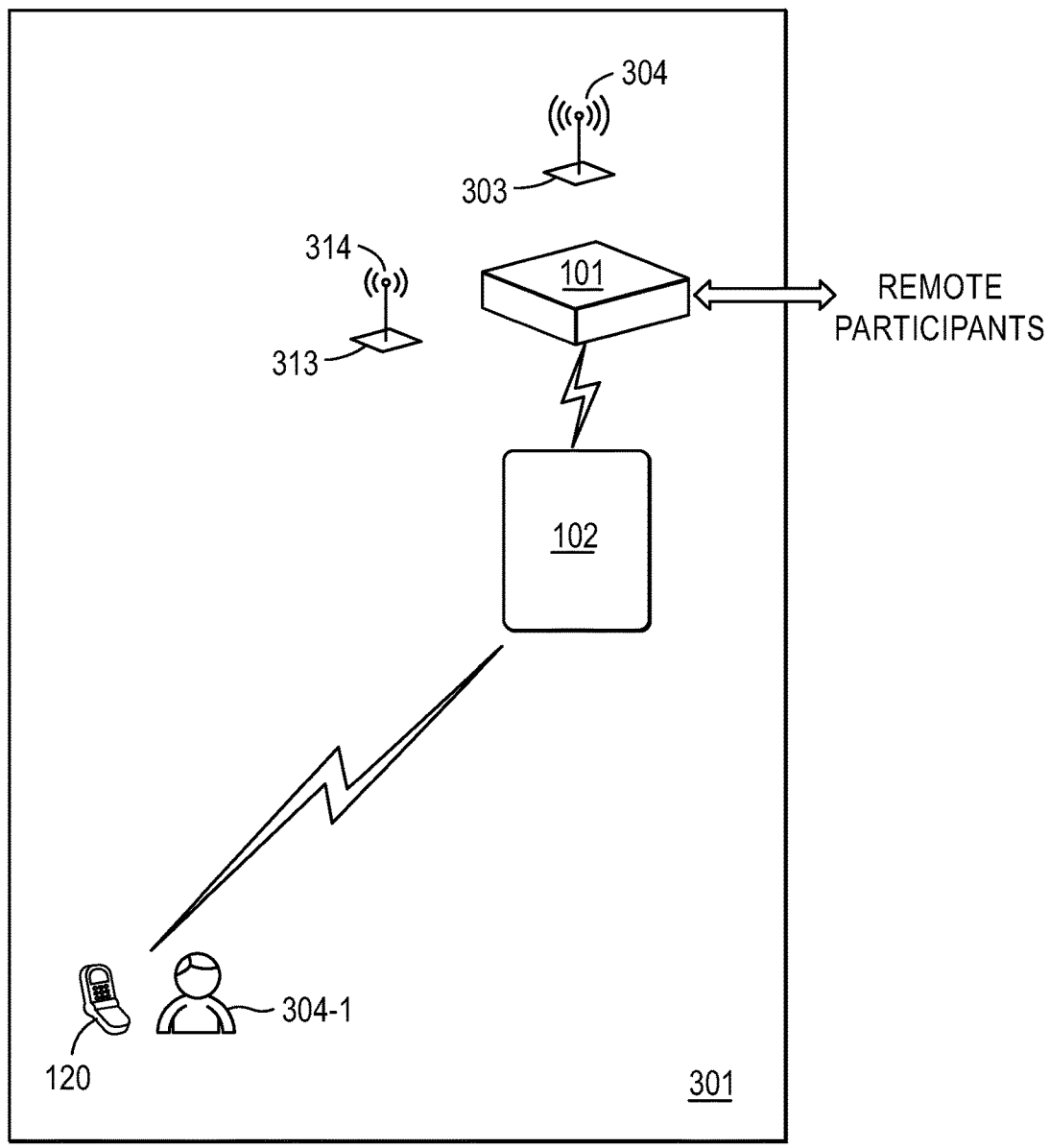
FIG. 3 is a system diagram illustrating an embodiment of a smart automated teleconferencing system that employs a beaconing system to enable context based proximity location and that enables the tracking of meeting participation.

Additionally, FIG. 3 shows a beacon 303 that broadcasts a beacon signal 304. In this particular embodiment, the beacon 303 broadcasts a Bluetooth Low Energy signal 304 (also referred to as BLE, Bluetooth LE or Bluetooth Smart). Such signals may be compliant with IEEE 802.15; 802.15.4-206. Other different beacon types and signals can be used, for example including Bluetooth, DECT, Wi-Fi, and the like. The beacon signal 304 enables a prospective attendee to determine whether they are located at the physical location of the meeting host, in particular, to identify that they are at a location close enough to the host conferencing system 101 to enable participation in the meeting. In most cases that means in the same room as the conferencing system 101 and beacon 303.

To further facilitate this embodiment, the beacon 303 may incorporate a unique identifier configured to enable discrimination from other beacons. In one embodiment the beacon 303 is characterized by a UUID (a universally unique identifier) of a type generally known in the art. The UUID identifies that the beacon signal 304 is associated with the meeting location 301. In some embodiments, the UUID for the beacon is included in the calendaring information associated with the teleconference meeting.

One aspect enables a participant to detect the beacon and enter the meeting while a mobile electronic device carried by the participant communicates to the meeting coordinator 102 that the participant is in the meeting.

The following describes one approach for enabling this embodiment. A prospective meeting participant 304-1 may have a mobile electronic device 120 on or near their person. The device 120 is configured to enable the participant's proximity to the meeting to be determined with sufficient accuracy. Once a determination is made that the device 120 is close enough to enable the participant 304-1 to join in the meeting, a message can be transmitted from the device 120 to the meeting coordinator 102 enabling the coordinator 102 to update a roster to reflect that the participant 304-1 is in the meeting. This is achieved without manual input from any of the meeting participants. Thus, a seamless process is achieved.

Examples, of suitable devices 120 comprise devices that can receive a beacon signal, determine whether the beacon signal meets threshold criteria, and transmit a message announcing that a participant is in the meeting. Such devices can comprise a wide range of mobile electronic devices. Wearable technologies such as a Google Glass® and Moto 360® (manufactured by Motorola) can be used, as can be devices like CuffLinc™ (produced by Cuff, Inc. of California). Other wearable devices like smart watches and headsets can be used. Tablet devices and PDA's can also be used as can "smart phones" and other cellular communication devices. Such devices are generally described herein at various portions of this specification.

Figure 4:
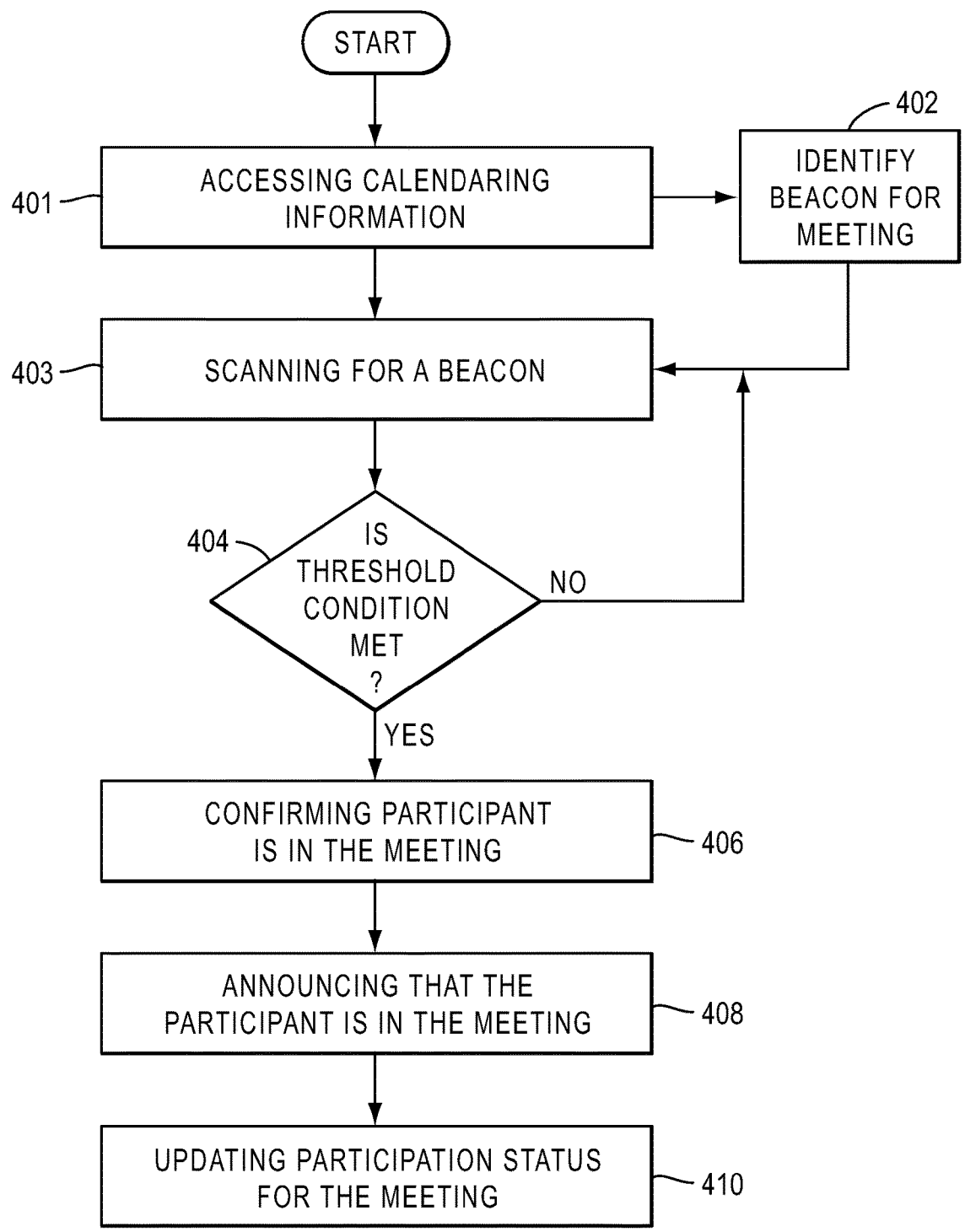
FIG. 4 is a flow diagram describing a method of context based proximity location and automated tracking of meeting participation status.

FIG. 4 provides a general description of one embodiment suitable for use in automatically tracking participation of a meeting attendee. In a crowded office environment, there can be a number of different beacons that a device may detect. Using such beacons to determine proximity to a meeting location can create a number of sources of ambiguity in determining the location of a mobile electronic device and thus of a meeting participant associated with such a device. This embodiment includes a method of using context specific proximity location to determine whether a meeting participant is in a correct location for a meeting and is participating in the meeting.

In a first embodiment, a mobile electronic device is configured to access calendaring information associated with the meeting. This information may include a time and location for a meeting (such as a teleconference meeting) and a unique identifier for a beacon associated with the meeting location. The calendaring information can also include the identity of the scheduled meeting attendees (the meeting invitees) and contact information associated with those invitees.

At 401, the mobile electronic device 120 associated with a meeting invitee 304-1 accesses the calendaring information. In response to a prompt or alert associated with a calendared meeting, a process becomes activated. Such an alert can simply be a calendared alert that prompts the mobile electronic device 120 at a time prior to the teleconference meeting. In this embodiment, the calendaring information can be retrieved from a memory of the mobile electronic device 120. The calendaring information can be retrieved from other sources.

At 402, the mobile electronic device 120 identifies the beacon associated with the meeting based on the calendaring information. The calendaring information identifies the beacon associated with the meeting. For example, the calendaring information includes a UUID for the beacon. Alternatively, the calendaring information may identify the meeting room, and the mobile electronic device 120 may perform a table lookup or the like to ascertain the UUID for the beacon associated with that meeting room At 403, the mobile electronic device 120 begins scanning for the beacon associated with the meeting location. The unique identifier enables the mobile electronic device 120 to disambiguate the correct beacon from other beacons and other signals. In one implementation, the scanning can be done relatively infrequently, perhaps once every second. This low scan rate enables battery power to be conserved for the mobile electronic device 120. The scan rate can vary depending on the implementation. As the mobile electronic device 120 becomes closer to the beacon 303 (and thus to teleconference location 301) the beacon signal strength increases. Once the signal strength becomes sufficient the mobile electronic device 120 scan rate can increase. In one implementation the increased scan rate can be about ten times a second. These are implementation details that can vary substantially based on the needs of the system and choices of the system implementers.

At 404, the beacon signal 304 is compared with a predetermined threshold condition to determine whether the mobile electronic device 120 (and thus the associated invitee) is located at the meeting location and thus whether the associated invitee is in the meeting. The threshold condition can be a measured signal strength for the beacon signal 304 as received at the mobile electronic device 120. Such a signal strength can be compared using a received signal strength indicator (RSSI) value. The measured signal strength can be compared with the predetermined threshold signal strength value. When this condition is met the invitee can be considered in the meeting. When the threshold condition is not met, the scanning may continue. Filtering can be used to increase the accuracy of such signal strength measurements. In one example, Kalman filtering can be used.

Additionally, the threshold condition can have a time component. For example, a specified signal strength must be exceeded for a specified period of time to confirm that the invitee is in the room. For example, a minimum signal strength must be exceeded for 15 seconds before the invitee is considered in the room. Thus, at 404, when the threshold is met, the invitee associated with the mobile electronic device 120 is confirmed as being in the meeting (at 406).

In some embodiments, if the threshold condition is not met after scanning for a specified time period, the scanning can be stopped automatically to save power.

The location of the mobile electronic device 120 and associated invitee can be further confirmed using a secondary proximity confirmation process. In one approach, a second threshold condition can be used to confirm that the mobile electronic device 120 is in the meeting. In one embodiment, after the first threshold condition is met a second threshold condition must be satisfied. For example, once the first threshold condition is satisfied, the second threshold condition can be applied to confirm location in the room. For example, the mobile electronic device 120 is configured to detect the beacon signal 304 again. For example a second signal strength threshold value can be employed. The second signal strength threshold condition comprises a higher RSSI value than the first, indicating that the mobile electronic device 120 is closer to the beacon 303 and thus the proximity to the meeting location is confirmed with a far greater degree of accuracy. Also, as with the first threshold described above, if the second threshold condition is not met after scanning for a specified time period, the mobile electronic device 120 may determine that it is not in the meeting. Additionally, in some embodiments, after that specified time, scanning can be stopped to save power and reduce processing overhead in the device 120.

In another approach, confirming (at 406) can be addressed differently. The meeting location can comprise a second beacon device. Referring again to FIG. 3 and FIG. 4 this embodiment is further described. The second beacon device 313 can transmit a beacon 314 that is impeded substantially by the walls of a meeting location (e.g., a conference room). For example, some smart phones have receivers and/or optical systems that can receive light signals. In one example, the second beacon device 313 can transmit a light signal 314 detectable by the mobile electronic device 120. In one implementation the mobile electronic device 120 comprises a "smart" telephone having an infrared light detector. Thus, a second beacon device 313 can broadcast an infrared optical signal detectable by the mobile electronic device 120. This is advantageous because the optical signal 314 is not detectable from outside the meeting room and thus its reception provides a confirmation of location with a high degree of certainty. Many such implementations can use light wavelengths invisible to the human eye. In another similar implementation, an audio signal can be used. Smart phones 120 have audio receivers as a matter of course and are well adapted to exploit this methodology. Again a second beacon device 313 can transmit an audio signal 314 detectable by the mobile electronic device 120. In one implementation the broadcast audio signal 314 can be undetectable to a human ear and yet still detectable to the audio receiver of the mobile electronic device 120 (e.g. the "smart" telephone).

Although disclosed with a beacon device arranged in a conference room and the mobile electronic device 120 operating as a scanner, the architecture can be altered such that the mobile electronic device 120 operates as the beacon device and the meeting coordinator 102 scans for the beacon signals emanating from mobile electronic device 120.

Upon confirming that the device 120 (and associated participant) is in the meeting, the mobile electronic device 120 provides an indication that the participant is in the meeting. For example, the device 120 transmits a message announcing that the participant is in the meeting (at 408). The message is sent to the meeting coordinator 102, where the roster of meeting participants is updated to reflect whether the participant is in the meeting or not in the meeting (at 410). The roster is suitably updated to reflect this status. This message may be sent using wireless communication between the mobile electronic device 120 and the coordinator 102. For example, cellular Bluetooth, Bluetooth Low Energy, Digital Enhanced Cordless Telecommunications (DECT), Wi-Fi, and other forms of wireless communication can be used. The coordinator 102 can then provide this information for consumption. This information can be displayed on a display screen of the coordinator 102. This information can be transmitted to remote displays or sent to handheld devices of the participants with a listing of participants that are in the meeting and not in the meeting.

The participation status of a participant in a meeting can be tracked throughout the meeting by interaction between the meeting coordinator 102 and the mobile electronic device 120 of an attendee. Once a meeting participant has entered the meeting, his/her presence can be tracked. In one example, a pulsed signal can be sent by the coordinator 102 to one or more of the devices 120 of the participants at the meeting location. In response, the device 120 may send an acknowledgement signal throughout the meeting. The interval between pulses is an implementation detail comprising a wide range of possible intervals. If the coordinator 102 does not receive the acknowledgement signal, the coordinator 102 can consider the participant as being not in the meeting and treated as a departed attendee. The roster can then be updated to reflect this new status.

Moreover, using this updated information embodiments of the system can accomplish an number of added features.

In one embodiment, the updated information can be used to track invitees that are not in the meeting. When invitees are not in the meeting, the teleconferencing system 101 can attempt to directly contact the absent invitees using the contact information from the calendaring information. Additionally, in some embodiments the participant mobile devices 120 can have applications stored on the devices 120 that enable responses to these direct contacts. For example, an absent invitee can send a message announcing that they are "on the way" or providing an estimated time of arrival or a message stating that they will not attend the meeting, as well as other relevant messages.

Additionally, when a participant departs a meeting, the coordinator 102 can use the calendaring information to reconnect the departed participant if desired. For example, a participant may leave the meeting to go to another location, but still wishing to participate in the meeting while in transit. In one such example case, upon detecting a participant leaving the meeting, the coordinator 102 can access the calendaring information and a mobile telephone number for the departing attendee and attempt to reconnect them to the meeting by contacting them using the mobile telephone number. If the participant is reconnected, he can be listed as a remote attendee and tracked as such on the roster.

In another embodiment directed to security concerns, when a participant enters the meeting location the coordinator 102 may send a command to a client application resident on the participant's device 120 instructing it to shut down or terminate telephone calls or recording for the duration of the meeting, thereby preventing dissemination of meeting information through the device 120.

In another aspect, a mobile device 120 can be configured as a meeting organizer. The calendaring information is stored on the mobile device 120. The mode of operation of such a device 120 is similar to that described above, one difference being that once the mobile device 120 configured as a meeting organizer arrives at the meeting location, the calendaring information is transmitted from the mobile device 120 to the meeting coordinator 102 to enable the meeting.

The techniques described herein can be embodied on a tangible non-transitory computer readable medium for execution on processors of various electronic devices including but not limited to mobile electronic devices such as the meeting coordinator 102, the teleconferencing system 101, and the mobile devices 120 associated with the participants, as well as others.

Figure 5:
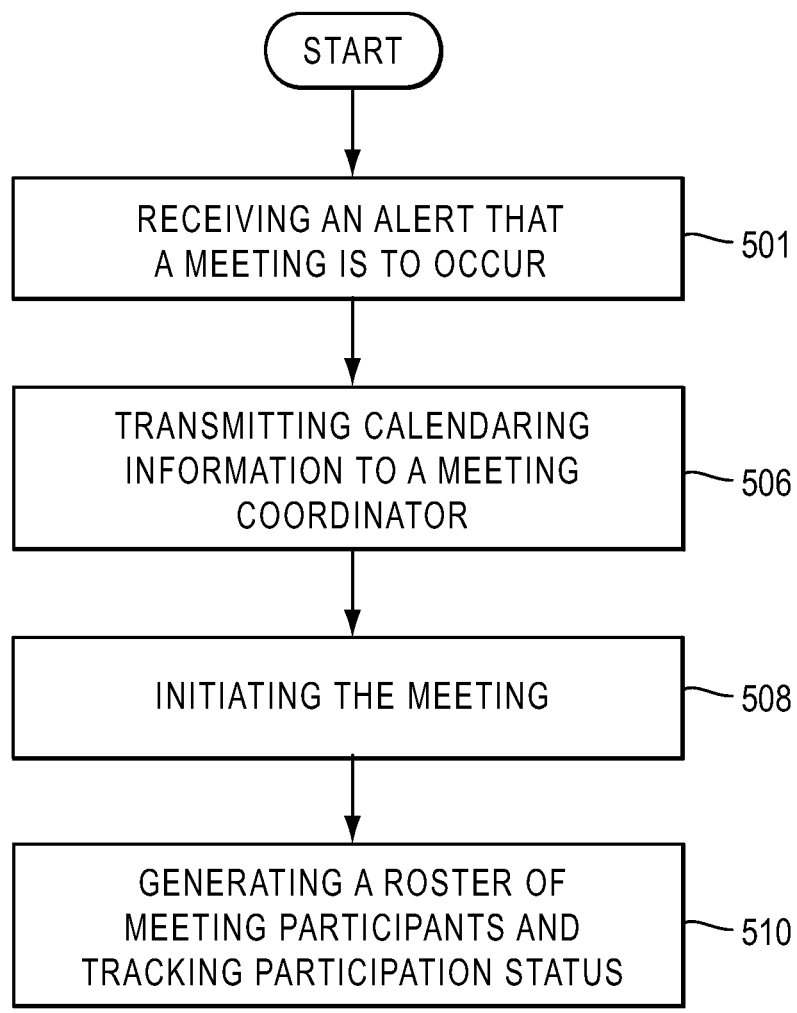
FIG. 5 is a flow diagram describing a method of operating a meeting organizer to automatically set up and conduct a teleconference.

FIG. 5 provides a general description of one embodiment suitable for automatically initiating a meeting with calendaring information stored on a mobile electronic device. In this embodiment, the mobile electronic device 120 is configured as a meeting organizer.

At 501, prior to a time for a meeting, the meeting organizer 120 receives an alert that the teleconference meeting is to occur. In one example, this alert may provided by the calendaring information stored in the memory of the meeting organizer 120. This alert is used to activate the system. In one example, the alert that triggers the activation of the system is an ordinary reminder associated with a calendar program. In response to the alert, the mobile electronic device 120 may access the calendaring information associated with the meeting. A beacon for the meeting location may be identified, for example from the calendaring information.

At 506, the organizer 120 transmits the calendaring information from the meeting organizer 120 to the meeting coordinator 102. This transmission of data can be a secure data transmission using data encryption, password keys, or any of a wide variety of data security approaches.

At 508, using the contact information provided by the organizer 120 the meeting coordinator 102 communicates with the teleconferencing system 101 to contact and join the remote attendees to the meeting. Using this approach, the coordinator 102 sets up the meeting and performs the ancillary tasks such as noise cancelling and sending reminders to meeting attendees that have not joined the meeting.

Additionally, at 510 a roster of participants is generated using the calendaring information as well as information concerning guest participants and updates. Such a roster is generated and updated as indicated in detail herein above.

In another embodiment, proximity location can be determined using a number of beacons or, more generally, "position dismbiguators" that assist in enabling proximity detection and position location of a participant. These can assist in proximity detection for meeting invitees and also prospective participants that were not necessarily invited to the meeting.

Figure 6:
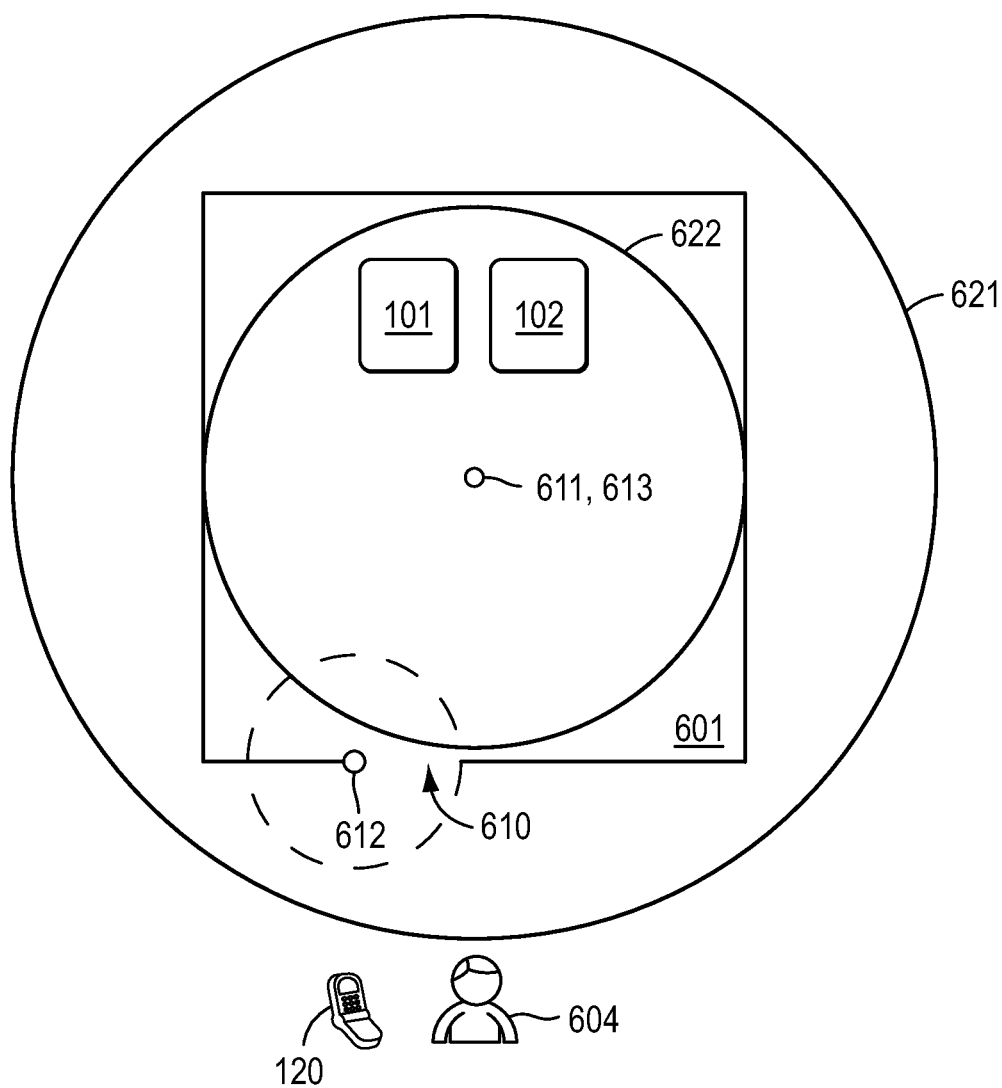
FIG. 6 is a system diagram illustrating an embodiment of a smart automated teleconferencing system that employs a beaconing system to enable multi beacon proximity location and that enables the tracking of meeting participation.
Figure 7:
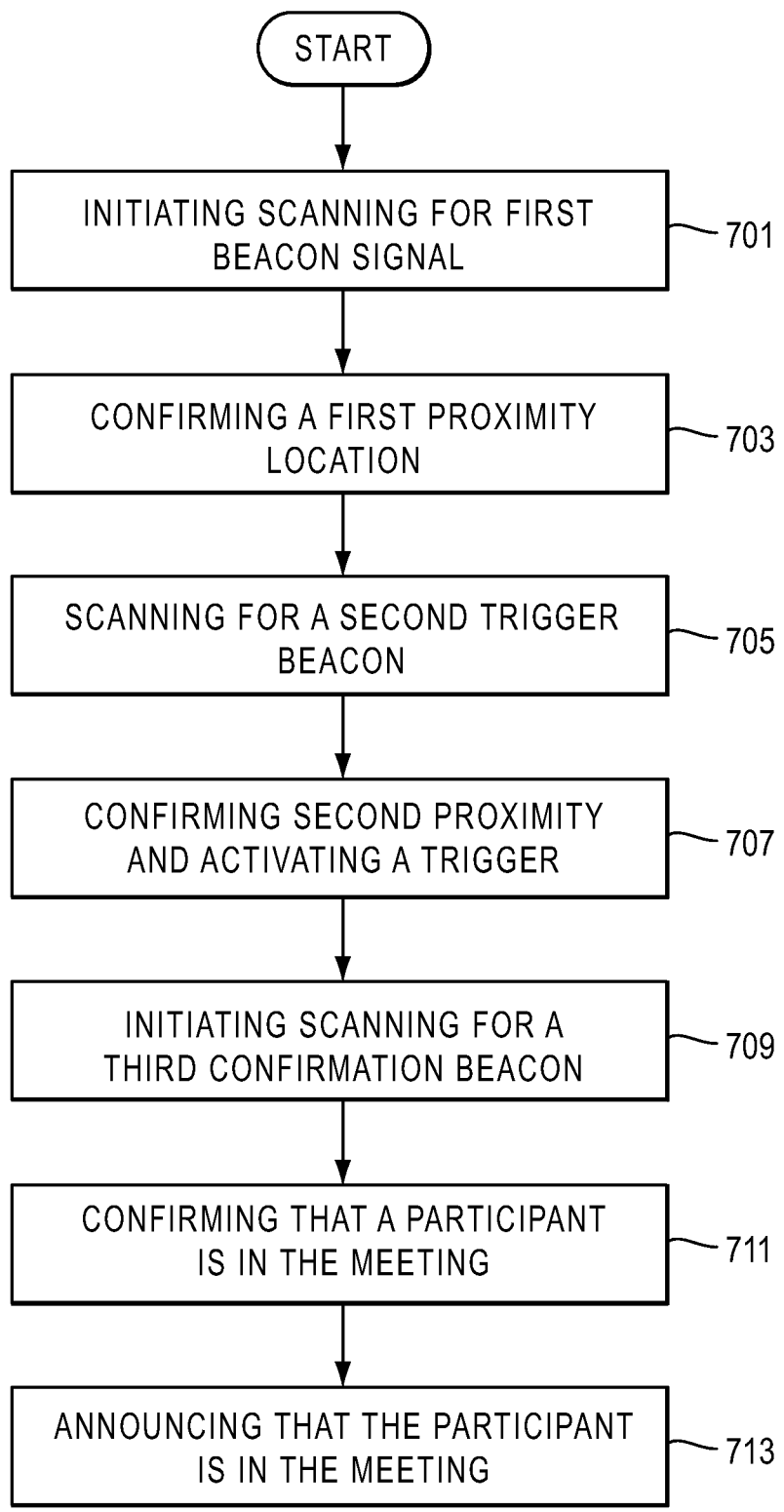
FIG. 7 is a flow diagram describing a method of operating a multi-beacon proximity location system to enable location determination using personal mobile electronic devices and enable the tracking of meeting participation.

In one such embodiment, as shown in FIG. 6, a "smart conference room" can be used to facilitate a meeting. For example, the smart conference room can comprise a teleconference meeting location 601. Such a meeting location is a space (typically a room) suitable for hosting a teleconference meeting. A teleconference conferencing system 101, as previously described, can be arranged in the room to operate as a meeting facilitator. As described above, the system 101 can enable the meeting by connecting remotely located meeting participants to the teleconference and can assist in operating meeting peripheral devices (display screens, projectors, speakers, microphones, and the like). A meeting coordinator 102 (which can be as configured above) is also located at the meeting location 301. As above, the meeting coordinator 102 is in communication with the conferencing system 101 and also can communicate with mobile electronic devices 120 associated with a meeting participant.

Additionally, FIG. 6 shows two position disambiguation systems 611, 612. Although this embodiment shows two, more can be employed. Such disambiguation systems can comprise beacons using wireless signals, audio signals, optical systems as well as other types. Physical proximity devices can also be used. For example, access entry systems and other associated proximity systems can be used. For example, an RFID entry access system can be used to assist in accurate proximity sensing.

In the present embodiment a first beacon device 611 is shown. In this implementation, the first beacon device 611 is arranged in the meeting location 601, and may employ, for example, the wireless technologies described elsewhere herein. As before, the beacon device 611 has a unique identifier enabling its beacon signal 621 to be distinguished from others. This unique identifier can be associated with the beacon device 611 in calendaring information associated with the teleconference meeting. The first beacon signal 621 is intended to be detectable outside of the meeting location 601.

Additionally, a second disambiguation device 612 can be arranged near an entrance to the room 601. This second disambiguation device 612 is referenced in this disclosure as a "trigger" or in some cases a "trigger beacon." It is generally only detectable when a participant is very close to the entrance 610 of the meeting location. In this implementation, a second Bluetooth beacon is used as the second trigger beacon 612 located at an entrance 610 to the room 601. Any sort of near proximity detection apparatus can be used to enable this trigger 612.

Additionally, this embodiment can include a third location disambiguation. This third disambiguation can be accomplished by a separate reading taken from one of the other disambiguation devices or by a third disambiguation device 613. In this embodiment, the third disambiguation apparatus enables a proximity confirmation method. In the depicted embodiment, the third disambiguation device 613 comprises the first beacon device 611, but the first beacon device 611 is configured such that in operation it can only be detected from inside the meeting location 601. This is shown diagrammatically by a second signal detection radius 622 that is configured to be detectable within the room but not outside the room.

Although, this implementation can be used to track scheduled meeting invitees and determine whether they are in the meeting, this embodiment is particularly well suited to assisting in proximity location for unscheduled or guest meeting participants 604.

The following describes a method embodiment suitable for utilizing the smart conference room 601 to enable the tracking of participation status of a participant 604. Although disclosed with a beacon device arranged in a conference room and the mobile electronic device 120 operating as a scanner, the architecture can be altered such that the mobile electronic device 120 operates as the beacon device and the meeting coordinator 102 scans for the beacon signal emanating from mobile electronic devices 120.

At 701, a scan is initiated seeking the first beacon signal 621 emanating from the first beacon device 611 arranged at a predetermined destination. In this case, the destination is the smart teleconferencing room 601.

A great deal of power can be consumed by scanning for rooms using a mobile electronic device 120 (here associated with a prospective meeting participant 604). Accordingly, an embodiment uses an initial triggering event to prompt the device 120 to initiate the scanning for the appropriate beacon 611.

One approach to initiate scanning is described as follows. Even though a prospective meeting participant is not invited to a meeting he/she may still want to attend. In one embodiment, the prospective participant can simply manually implement a scan seeking the destination 601.

In another approach calendaring information accessible from the participant's mobile device 120 can be used to prompt scanning. Even though not invited, the prospective participant still can have access to meeting calendaring information. For example, if a list of meetings is stored on the participant's device 120, the participant 604 can still receive a prompt that a meeting is scheduled to occur even if the participant 604 is not scheduled for the meeting. A calendar reminder accessed from a mobile electronic device 120 can indicate a meeting time and place for a meeting that the participant 604 would like to attend (or is scheduled to attend). The reminder can be configured to initiate the scanning at 701. Such a prompt will typically occur at or before a meeting time, for example, just prior to the meeting, but can occur at any time before or during the meeting. As indicated, the prompt can be automatic in response to a calendared event or the participant can initiate the prompt.

As before, the unique identifier enables the mobile electronic device 120 to disambiguate the correct beacon from other signals. To save power, the initial scanning can be done infrequently at a low scan rate. However, as the mobile electronic device 120 becomes closer to the beacon 611 (and by association to teleconference location 301) the beacon signal strength increases. Once the detected signal strength surpasses some predetermined level, the polling (scanning) rate can increase. The actual implementation details can vary substantially based on the needs of the system and choices of the system implementers.

At 703 a first proximity to the meeting location is confirmed. In one embodiment, the received beacon signal 621 is compared with a first predetermined threshold condition to determine whether the mobile electronic device 120 (and thus the associated invitee) is determined to be operatively close to the meeting location (a first proximity to the meeting location). As before, the threshold condition can be a measured signal strength for the beacon signal 621 received at the mobile electronic device 120. When the first threshold condition is satisfied a next process can be initiated at 705. When the threshold is not met, the scanning may continue. As mentioned above, signal filtering can be used to increase the accuracy of such signal strength measurements.

As previously mentioned the threshold condition can be time related. For example, in order to confirm a desired first proximity to the meeting location 601, a specified signal strength must be exceeded for a specified period of time to confirm that the prospective participant is located at the desired first proximity to the meeting location 601. Thus, when the threshold is met, the prospective participant associated with the mobile electronic device is considered to be confirmed at the desired first proximity to the meeting location 601 (Step 703). Where the condition is not satisfied (for example, the device 120 merely moves past the room and continues to another destination) the scanning rate can slow or stop automatically to save power.

Thus, once the first condition is satisfied (and the device 120 deemed operatively close to the meeting location) the first proximity is considered confirmed. The confirmation of the first proximity activates a "trigger system," that is, operates as a precipitating event for a second proximity disambiguation event.

Accordingly, at 705 the process comprises scanning for a second trigger beacon. In this embodiment, a beacon 612 (comprising a trigger beacon) is arranged at the entrance 610 of the meeting location 601. In this embodiment, the trigger beacon 612 can be a very low power beacon capable of detection from only a very short distance from the beacon 612. Alternatively, a threshold condition for the trigger beacon 612 can be set very high such that it is met only when a scanning device 120 is very close to the trigger beacon 612.

As with the other beacons, the second trigger beacon 612 can have a UUID enabling unique identification. This information can be stored in association with other information concerning the meeting location 601 and can also be included as part of the calendaring information if desired. As described above, the scanning rate for the trigger beacon 612 can be increased until proximity is confirmed. Additionally, the scan can have a timer configured such that if proximity is not confirmed within a specified time period the scan rate can decrease and/or stop.

At 707, during scanning, a second proximity location is confirmed when the device 120 reaches the desired second proximity to the second beacon 612. This can be accomplished in a manner similar to the processes described above, e.g., the scanner 120 compares the received signal from trigger beacon 612 to a threshold condition. When the condition is satisfied, it confirms a second proximity to the trigger beacon 612 (and by association, the door 610). Additionally, in one embodiment, the trigger beacon strength can be set so low that the mere fact that the scanning device 120 detects it is the threshold condition that confirms proximity to the beacon 612 and door 610. The position of the trigger beacon 612 near the door 610 increases the likelihood that a participant is actually in the room rather than outside the room but merely close to the room. One example of a useful threshold is one where the mobile electronic device 120 is within 3 meters of the door 610.

In another embodiment, the proximity location process can be facilitated by a disambiguation device that is not a "beacon" but can be a proximity paired device such as those used in entry access systems. In one example, an RFID entry access device 612 can be positioned at the entry 610 to the meeting location such that the user mobile electronic device 120 recognizes that it is at a second proximity to the meeting location and confirms that the device 120 is at the second proximity.

At 709, the confirmation of proximity to the second trigger beacon 612 activates a "confirmation system" to initiate a scan for a third confirmation beacon 613. In this embodiment, the first beacon 611 comprises the third confirmation beacon 613. This process functions similarly to the scanning process used at 701 above. In this embodiment, the mobile electronic device 120 scans for a confirmation beacon 613 that is the same beacon as the first beacon 611 and uses the same beacon signal.

At 711, a third location proximity is confirmed and the participant is deemed to be "in the meeting" at the meeting location 601. Once the trigger initiates scanning, the mobile electronic device 120 uses a third threshold condition to determine a third proximity to confirm that it is present at the meeting location 601. In one embodiment, the threshold can be set very high such that it can be satisfied only when the mobile electronic device 120 is in the room 601 with the beacon 613. The threshold may be set high enough so that it cannot be detected outside the room. A feature is that both the second trigger beacon 612 and the third confirmation beacon 613 have been detected eliminating false determinations of presence in the room 601.

In another implementation the first beacon 611 can be a completely different beacon from the third beacon 613 and may have different frequencies, power, UUID, and/or position than the first beacon 611. For example, the third beacon 613 may employ light frequencies, audio frequencies, and the like. The trigger may put the scanner in a mode for monitoring for these alternative frequencies and identifiers.

Upon satisfying the third threshold condition, the mobile electronic device 120 and its participant are considered in the meeting.

At 713 upon confirming that the device 120 (and associated participant) is in the meeting the mobile electronic device 120 provides an indication that the participant is in the meeting. For example, as previously described above, the device 120 transmits a message announcing that the participant is in the meeting. The message is received by the meeting coordinator 102. As before, the roster of meeting participants is updated to reflect the presence of the participant in the meeting. If the new participant is a "guest" (an uninvited participant) the roster can be expanded to include the guest participant and track his status as well.

Another embodiment enables voice identification to identify local speakers. During a conference call, identifying which speaker is speaking poses some challenges. Speakers in the room can easily identify who is speaking in the room by simply observing and listening. Moreover, remote speakers are relatively easily determined by identifying the remote connection providing the voice or data feed to the conference room. Also, where the remote speaker is in a video conference he is readily identified by observing the video feed of the speaker. However, for a remote conference participant it can be difficult to determine who the speaker is in the conference room.

Efforts have been made to enable voice identification but have proved challenging in a real-time environment and can be computationally quite intensive. However, various embodiments can bring this to a manageable level by using the roster and tracking of attendees of the meeting to enable more effective voice and speaker recognition.

Using any of the approaches above, the automatic roster generation and participation status tracking features can be performed. Thus a roster of meeting participants is identified. From that roster, the participants that are attending the meeting locally in the room (e.g., MR, 301, 601 and other suitable smart conferencing locations) are determined. This enables a list of local participants to be generated. For these local participants a set of prerecorded unique digital voice signatures can be accessed. The accessed voice signatures enable digital voice recognition. Accordingly, during a conference as each local participant speaks, the speaker's voice can be compared with a sub-set of prerecorded unique digital voice signatures associated with only the local participants to ascertain the identity of the speaker. Using only those voice signatures for the local participants greatly reduces the time and computational power required to identify the local speaker. This speaker identity information can be provided to remote participants such that the remote participants can know who is speaking in the room. In some embodiments, the system may track and log the degree of participation of each attendee, for example reporting how much each participant contributed during the meeting.

Figure 8:
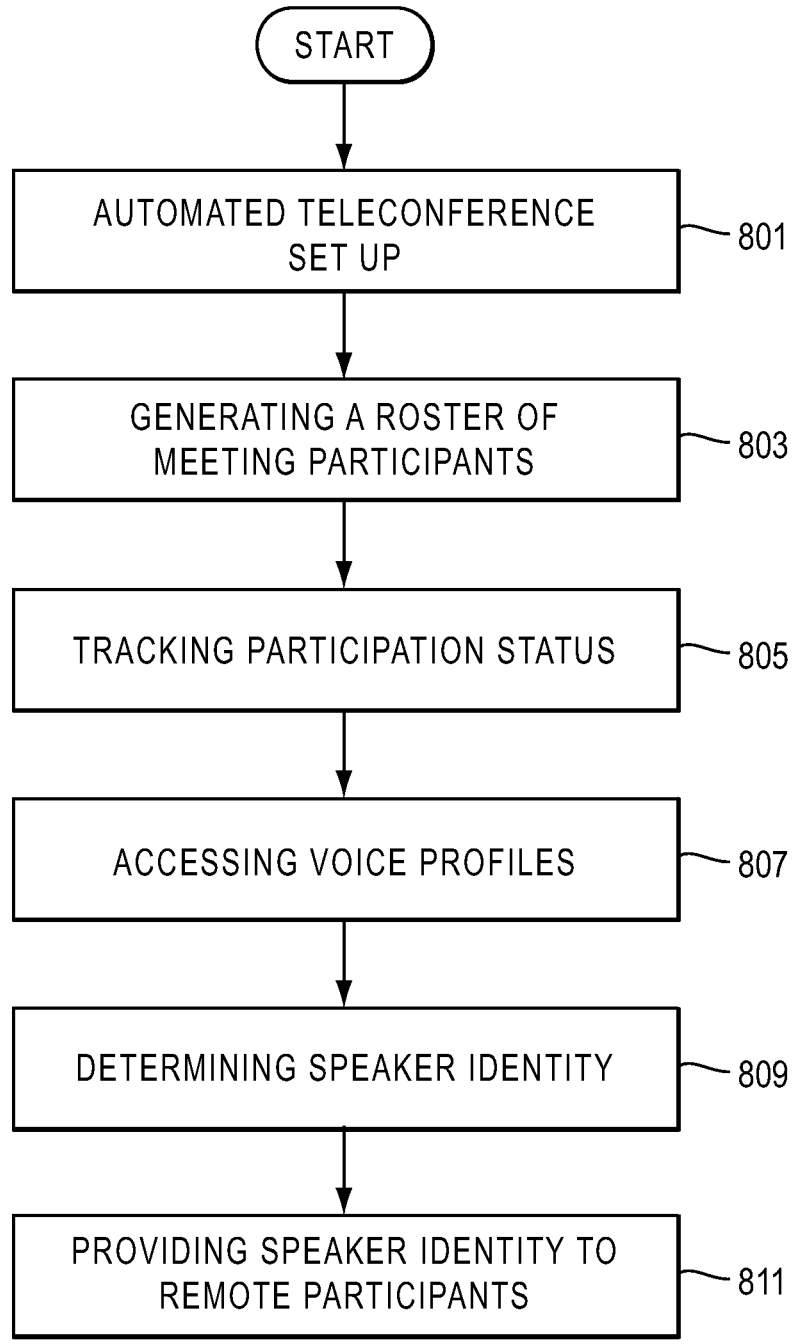
FIG. 8 is a flow diagram describing a method of determining speaker identity during a teleconferencing event.

The following FIG. 8 is a flow diagram illustrating a process embodiment suitable for enabling this technology.

At 801 an automated room set up process is performed, for example as described in the discussions of FIGS. 1-7 above.

At 803 a roster of meeting participants is generated using any of the embodiments described above as well as other methods known to those of ordinary skill in the art.

At 805, the participation status of the participants is tracked. This includes determinations of whether participants are in the meeting or not in the meeting and from which location each participant attends the meeting. The method tracks which participants are located at the physical location of the teleconference meeting (e.g., MR, 301, 601). Embodiments enabling such tracking are disclosed in detail in prior paragraphs of this disclosure. These and other methods can be used to track the physical location of meeting participants.

At 807, prerecorded voice profiles for meeting participants are accessed. These profiles can be recorded at any time prior to the meeting. These profiles are constructed to enable voice recognition when compared to an actual spoken voice. The profiles can be analog recordings or digital files constructed to effectively identify a speaker.

The profiles can be stored at a number of locations. For example, the prerecorded voice profiles can be stored in the memory systems of a network (e.g., 105 of FIG. 1) accessible to a meeting coordinator (e.g., 102 of FIG. 1). In an alternative, the voice profiles can be stored directly in the memory of the meeting coordinator 102 or even in the memory of the mobile devices 120 of various meeting participants. The roster is then used to identify which participants are local to the meeting location. Then a sub-set of prerecorded voice profiles is accessed. The sub-set may comprise voice profiles only for the attendees located at the meeting location.

At 809, the identity of the speaker is determined. In the process a local meeting participant speaks and a voice processor compares the speaker's voice with the subset of prerecorded voice profiles and determines the identity of the speaker. Because the sub-set of voice profiles includes only the participants locally attending the meeting, the processing is not as intensive as may otherwise be required.

In one embodiment, a digital signal processor of the meeting coordinator 102 receives voice data from the speaker, compares the voice data with the available sub-set of voice profiles and determines the identity of the speaker.

A number of different methodologies can be used to perform speaker identification. Such methodologies can include, but are not limited to, frequency estimation, hidden Markov models, Gaussian mixture models, pattern matching algorithms, neural networks, matrix representation, vector quantization, and decision trees. Some systems can also use "anti-speaker" techniques, such as cohort models and world models. Digital signal processing may be applied to compare the speaker's voice to the pre-recorded data to determine the identity of the speaker.

In another approach speaker identification can be done using the mobile electronic devices 120, which can perform speaker identification in the same manner as indicated above. In an alternative embodiment, the device 120 can store one or more prerecorded voice profiles for the participant associated with the device 120. In such an approach, when a speaker in the room speaks, each device 120 may compare the speaker's voice to the voice profile(s) stored thereon. Where no match is found, the device 120 performs no action. However, where a device 120 matches the speaker to the profile, it can send a message to the meeting coordinator 102 announcing that the speaker is the participant associated with the device 120.

At 811, the identity of the speaker is provided to the remote participants enabling them to identify the speaking participant. The coordinator 102 may transmit messages to the remote participants enabling them to determine the speaker. For example, the roster may be updated to indicate which participant is speaking.

These embodiments have been particularly shown and described with respect to certain implementations and features. However, it should be noted that the above-described embodiments are intended for illustration, not limitation of scope.

Figure 9:
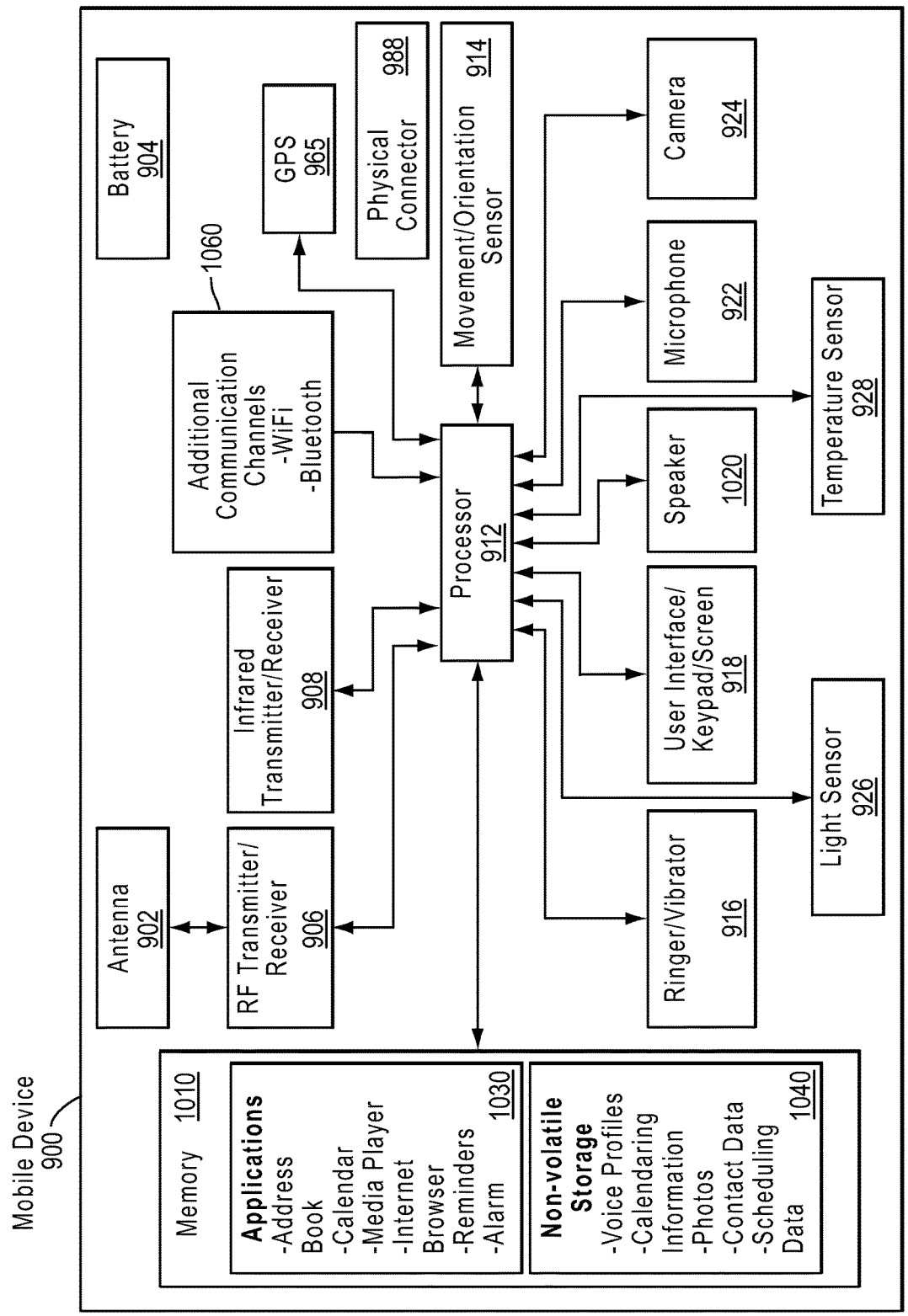
FIG. 9 is a block diagram of an exemplary mobile electronic device such as a meeting participant may carry on their person.

FIG. 9 is a block diagram of an exemplary mobile electronic device 900 which may operate in embodiments of the disclosed technology. Such devices can comprise a wide range of devices including personal electronic devices. Examples include but are not limited to, cellular telephones, tablet devices, personal digital assistants (PDA's), music players, lap top or other portable computer devices, wearables such as headsets and watches, and the like. Exemplary electronic circuitry of a mobile device is depicted. The mobile device 900 includes one or more microprocessors 912, and memory 1010 (e.g., non-volatile memory such as ROM and volatile memory such as RAM) which stores processor-readable code which is executed by one or more processors of the control processor 912 to implement the functionality described herein. Such processors can have a plurality of modules dedicated to achieving specified operation. Such modules can be specific hardware structures or software applications or programs or firmware applications or programs.

Mobile device 900 may include, for example, processors 912 and memory 1010 including applications and non-volatile storage. Applications may include the software for the user interface 918. The processor 912 can implement communications, as well as any number of applications, including the interaction applications discussed herein. Memory 1010 can be any variety of memory storage media types, including non-volatile and volatile memory. A device operating system handles the different operations of the mobile device 900 and may contain user interfaces for operations, such as placing and receiving phone calls, text messaging, checking voicemail, and the like. The applications 1030 can be any assortment of programs, such as a camera application for photos and/or videos, an address book, a calendar application, a media player, an Internet browser, games, other multimedia applications, an alarm application, other third party applications, the interaction application discussed herein, and the like. The non-volatile storage component 1040 in memory 1010 can contain data such as web caches, music, photos, contact data, scheduling data, prerecorded voice profiles, calendaring information, beacon information, and other files.

The processor 912 also communicates with RF transmit/receive circuitry 906 which in turn is coupled to an antenna 902, with an infrared transmitter/receiver 908, with any additional communication channels 1060 like Wi-Fi or Bluetooth, and with a movement/orientation sensor 914 such as an accelerometer. Accelerometers have been incorporated into mobile devices to enable such applications as intelligent user interfaces that let users input commands through gestures, indoor GPS functionality which calculates the movement and direction of the device after contact is broken with a GPS satellite, and to detect the orientation of the device and automatically change the display from portrait to landscape when the phone is rotated. An accelerometer can be provided, e.g., by a micro-electromechanical system (MEMS) which is a tiny mechanical device (of micrometer dimensions) built onto a semiconductor chip. Acceleration direction, as well as orientation, vibration and shock can be sensed. The processor 912 further communicates with a ringer/vibrator 916, a user interface keypad/screen 918, one or more speakers 1020, a microphone 922, a camera 924, a light sensor 926 and a temperature sensor 928. The user interface, keypad and screen may comprise a capacitive touch screen in accordance with well-known principles and technologies.

The processor 912 controls transmission and reception of wireless signals. During a transmission mode, the processor 912 provides a voice signal from microphone 922, or other data signal, to the RF transmit/receive circuitry 906. The transmit/receive circuitry 906 transmits the signal to a remote station (e.g., a fixed station, operator, other cellular phones, etc.) for communication through the antenna 902. The ringer/vibrator 916 is used to signal an incoming call, text message, calendar reminder, alarm clock reminder, or other notification to the user. During a receiving mode, the transmit/receive circuitry 906 receives a voice or other data signal from a remote station through the antenna 902. A received voice signal is provided to the speaker 1020 while other received data signals are also processed appropriately.

Additionally, a physical connector 988 can be used to connect the mobile device 900 to an external power source, such as an AC adapter or powered docking station. The physical connector 988 can also be used as a data connection to a computing device and/or various embodiments of the controllers 100 described herein. The data connection allows for operations such as synchronizing mobile device data with the computing data on another device. A GPS transceiver 965 utilizing satellite-based radio navigation to relay the position of the user applications is enabled for such service.

The example computer systems illustrated in the figures include examples of computer readable storage media. Computer readable storage media are also processor readable storage media. Such media may include volatile and non-volatile, removable and non-removable media implemented in any method or technology for storage of information such as computer readable instructions, data structures, program modules or other data. Computer storage media includes, but is not limited to, RAM, ROM, EEPROM, cache, flash memory or other memory technology, CD-ROM, digital versatile disks (DVD) or other optical disk storage, memory sticks or cards, magnetic cassettes, magnetic tape, a media drive, a hard disk, magnetic disk storage or other magnetic storage devices, or any other medium which can be used to store the desired information and which can accessed by a computer.

Figure 10:
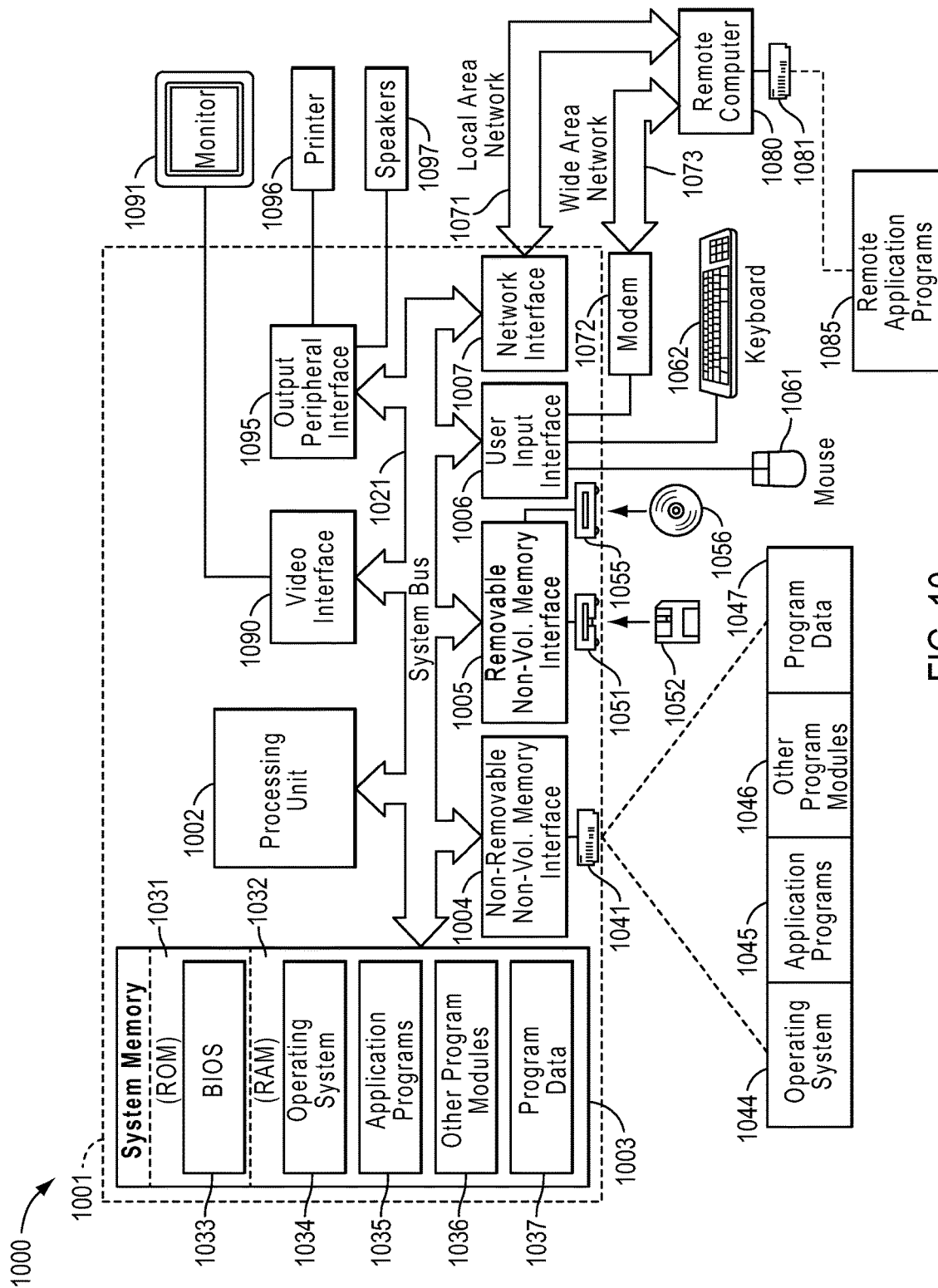
FIG. 10 is a block diagram of an exemplary general purpose computer that can operate many of the systems described herein.

FIG. 10 illustrates an example of a suitable computing system environment 1000 which may be used in the foregoing technology as any of the processing devices described herein. Multiple computing systems may be used as servers. In one implementation it can comprise the coordinator 102. The system described in FIG. 9 may serve as the coordinator 102 as well. The system can support the operation of the smart conferencing systems disclosed throughout.

With reference to FIG. 10, an exemplary system for implementing the invention includes a general purpose computing device in the form of a computer 1001. In one instance, the teleconferencing system 101 can comprise the computer 1001 described herein. Components of computer 1001 may include, but are not limited to, a processing unit 1002, a system memory 1003, and a system bus 1021 that couples various system components including the system memory to the processing unit 1002. The system bus 1021 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1001 may include a variety of computer readable media. Computer readable media can be any available media that can be accessed by computer 1001 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 1001.

The system memory 1003 includes computer storage media in the form of volatile and/or nonvolatile memory such as read only memory (ROM) 1031 and random access memory (RAM) 1032. A basic input/output system 1033 (BIOS), containing the basic routines that help to transfer information between elements within computer 1001, such as during start-up, is typically stored in ROM 1031. RAM 1032 typically contains data and/or program modules that are immediately accessible to and/or presently being operated on by processing unit 1002. By way of example, and not limitation, FIG. 10 illustrates operating system 1034, application programs 1035, other program modules 1036, and program data 1037.

The computer 1001 may also include other removable/non-removable, volatile/nonvolatile computer storage media. By way of example only, FIG. 10 illustrates a hard disk drive 1004 that reads from and writes to non-removable, nonvolatile magnetic media, a magnetic disk drive 1051 that reads from and writes to a removable, nonvolatile magnetic disk 1052, and an optical disk drive 1055 that reads from and writes to a removable, nonvolatile optical disk 1056 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

The hard disk drive 1041 is typically connected to the system bus 1021 through a non-removable memory interface such as interface 1004, and magnetic disk drive 1051 and optical disk drive 1055 are typically connected to the system bus 1021 by a removable memory interface, such as interface 1005.

The drives and their associated computer storage media discussed above and illustrated in FIG. 7 provide storage of computer readable instructions, data structures, program modules and other data for the computer 1001. In FIG. 10, for example, hard disk drive 1041 is illustrated as storing operating system 1044, application programs 1045, other program modules 1046, and program data 1047. Note that these components can either be the same as or different from operating system 1034, application programs 1035, other program modules 1036, and program data 1037. Operating system 1044, application programs 1045, other program modules 1046, and program data 1047 are given different numbers here to illustrate that, at a minimum, they are different copies. A user may enter commands and information into the computer 20 through input devices such as a keyboard 1062 and pointing device 1061, commonly referred to as a mouse, trackball or touch pad. Other input devices (not shown) may include a microphone, joystick, game pad, satellite dish, scanner, or the like. These and other input devices are often connected to the processing unit 1002 through a user input interface 1006 that is coupled to the system bus, but may be connected by other interface and bus structures, such as a parallel port, game port or a universal serial bus (USB). A monitor 1091 or other type of display device is also connected to the system bus 1021 via an interface, such as a video interface 1009. In addition to the monitor, computers may also include other peripheral output devices such as speakers 1097 and printer 1096, which may be connected through an output peripheral interface 1009.

The computer 1001 may operate in a networked environment using logical connections to one or more remote computers, such as a remote computer 1008. The remote computer 1008 may be a personal computer, a server, a router, a network PC, a peer device or other common network node, and typically includes many or all of the elements described above relative to the computer 1001, although only a memory storage device 1081 has been illustrated herein. The logical connections depicted here include a local area network (LAN) 1071 and a wide area network (WAN) 1073, but may also include other networks. Such networking environments are commonplace in offices, enterprise-wide computer networks, intranets and the Internet.

When used in a LAN networking environment, the computer 1001 is connected to the LAN 1071 through a network interface or adapter 1007. When used in a WAN networking environment, the computer 1001 typically includes a modem 1072 or other means for establishing communications over the WAN 1073, such as the Internet. The modem 1072, which may be internal or external, may be connected to the system bus 1021 via the user input interface 1006, or other appropriate mechanism. In a networked environment, program modules depicted relative to the computer 1001, or portions thereof, may be stored in the remote memory storage device. By way of example, and not limitation, FIG. 10 illustrates remote application programs 1085 as residing on memory device 1081. It will be appreciated that the network connections shown are exemplary and other means of establishing a communications link between the computers may be used.

The present invention has been particularly shown and described with respect to certain preferred embodiments and specific features thereof. However, it should be noted that the above-described embodiments are intended for illustration, not limitation of scope. Therefore, as is readily apparent to those of ordinary skill in the art, various changes and modifications in form and detail may be made without departing from the spirit and scope of this disclosure as set forth in the appended claims. Other embodiments and variations to the depicted embodiments will be apparent to those skilled in the art and may be made without departing from the spirit and scope of this disclosure as defined in the following claims. Further, reference in the claims to an element in the singular is not intended to mean "one and only one" unless explicitly stated, but rather, "one or more". Furthermore, the embodiments illustratively disclosed herein can be practiced without any element which is not specifically disclosed herein.

Various embodiments of the present disclosure can be implemented in digital electronic circuitry, or in computer hardware, firmware, software, or in combinations thereof. Embodiments of the present disclosure can be implemented in a computer program product tangibly embodied in a computer-readable storage device for execution by a programmable processor. The described processes can be performed by a programmable processor executing a program of instructions to perform functions by operating on input data and generating output. Embodiments of the present disclosure can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, processors receive instructions and data from a read-only memory and/or a random access memory. Generally, a computer includes one or more mass storage devices for storing data files. Such devices include magnetic disks, such as internal hard disks and removable disks, magneto-optical disks; optical disks, and solid-state disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits). As used herein, the term "module" may refer to any of the above implementations.

A number of implementations have been described. Nevertheless, various modifications may be made without departing from the scope of the disclosure. Accordingly, other implementations are within the scope of the following claims.

What is claimed is:

1. A method for accurately determining movement of a mobile electronic device relative to a predetermined meeting location, the method comprising:

scanning for a first beacon signal emanating from a first beacon located at the predetermined destination while the mobile electronic device is outside the meeting location;

detecting the first beacon signal;

confirming detection by the mobile electronic device of the first beacon signal;

responsive to confirming said detection of the first beacon signal, scanning for a second beacon signal emanating from a second beacon while the mobile electronic device is moved toward or into the meeting location;

confirming detection by the mobile electronic device of the second beacon signal;

responsive to confirming said detection of the second beacon signal, scanning for a third beacon signal while the mobile electronic device is located inside the meeting location;

confirming detection by the mobile electronic device of the third beacon signal; and responsive to confirming detection by the mobile electronic device of the third beacon signal, generating a message announcing that the mobile electronic device is at the meeting location.

2. The method of claim 1, wherein:

the meeting location comprises a room where the teleconference meeting is to be conducted;

the first beacon is located inside the room;

the second beacon is located at an entrance to the room; and the third beacon signal emanates from the first beacon or from another beacon located inside the room.

3. The method of claim 1, wherein confirming detection of the first beacon signal comprises:

comparing the first beacon signal with a threshold condition, wherein responsive to the threshold condition being met, proximity within a first range to the meeting location is confirmed.

4. The method of claim 1, wherein scanning for the second beacon signal comprises:

increasing a scan rate of the scanning for a specified period of time;

responsive to not confirming the detection of the second beacon signal within the specified period of time, reducing the scan rate; and responsive to confirming the detection of the second beacon signal within the specified period of time, initiating the scanning for the third beacon signal.

5. The method of claim 3, wherein confirming detection of the third beacon signal comprises:

comparing the third beacon signal with a different threshold condition, wherein responsive to the different threshold condition being met, presence of the mobile electronic device in the meeting location is confirmed.

6. The method of claim 5, wherein:

comparing the first beacon signal with the first threshold condition comprises measuring a signal strength for the first beacon signal, wherein the first threshold condition comprises a first relative signal strength indicator (RSSI) value, and wherein the first threshold condition is met when the signal strength for the first beacon signal exceeds the first RSSI value; and comparing the third beacon signal with the different threshold condition comprises measuring a signal strength for the third beacon signal, wherein the different threshold condition comprises a different RSSI value, and wherein the different threshold condition is met when the signal strength for the third beacon signal exceeds the different RSSI value.

7. The method of claim 6 wherein the third beacon signal and the first beacon signal emanate from the first beacon and wherein the first RSSI value is less than the different RSSI value.

8. The method of claim 1, wherein the first beacon signal comprises a Bluetooth signal and wherein the third beacon comprises one of an optical signal or a sound signal.

9. The method of claim 5 wherein the first beacon signal comprises a Bluetooth signal and wherein the generated message is configured as one of a wireless message or a cellular telephone message.

10. The method of claim 5 wherein the generated message is transmitted to a meeting coordinator system and can be used to track meeting participation status for meeting participants.

11. The method of claim 1 wherein initiating the scan for the first beacon signal is in response to a prompt by a calendar event identifying that a teleconference meeting is to occur at the predetermined meeting location.

12. A mobile electronic device configured to determine whether the device is at a teleconference meeting location, the predetermined mobile electronic device comprising:

a receiver;

a transmitter;

a memory for storing data;

a processor for executing computer readable instructions, the processor comprising a gross proximity module that enables, identification of a meeting time and the teleconference meeting location;

identification of a first beacon located at the teleconference meeting location, wherein the first beacon is configured to transmit a first beacon signal;

the receipt of an alert at a time prior to the meeting time;

responsive to the alert, initiating a scan for the first beacon signal;

confirmation that the mobile electronic device is at a first proximity to the teleconference meeting location;

an intermediate proximity module that enables, activating a trigger system affirming that the mobile electronic device is at a second proximity to the teleconference meeting location wherein the second proximity is closer to the teleconference meeting location than the first proximity;

a confirmation proximity module that enables, upon affirmation by the trigger system that the mobile electronic device is at the second proximity to the meeting location, scanning for a third beacon signal emanating from a third beacon located at the destination;

confirmation that the mobile electronic device is at the meeting location; and a meeting participation status module that enables, upon confirming that the mobile electronic device is at the meeting location, generating a message announcing that the mobile electronic device is at the meeting location, and transmitting the message announcing that the mobile electronic device is at the meeting location to a meeting coordinator that updates meeting participation for the meeting; and wherein:

a second beacon is located proximal to the meeting location: and the intermediate proximity module further enables scanning for a second beacon signal emanating from the second beacon, and confirming the second proximity to the second beacon responsive to a signal strength for the second beacon signal exceeding a relative signal strength indicator (RSSI) value.

\* \* \* \* \*